United States Patent [19]

Haynes

[11] 4,314,289

[45] Feb. 2, 1982

[54] BIASED PULSED RECORDING SYSTEMS AND METHODS

[75] Inventor: Munro K. Haynes, Tucson, Ariz.

[73] Assignee: International Business Machines Corporation, Armonk, N.Y.

[21] Appl. No.: 101,350

[22] Filed: Dec. 7, 1979

[51] Int. Cl.³ .................... G11B 21/10; G11B 5/09
[52] U.S. Cl. ................................ 360/77; 360/46; 360/65; 360/68
[58] Field of Search ............... 360/66, 39, 40, 41, 360/46, 65, 68, 77

[56] References Cited

U.S. PATENT DOCUMENTS

| | | | |
|---|---|---|---|
| 3,032,612 | 5/1962 | Goldmark | 360/66 |
| 3,070,670 | 12/1962 | Eldridge et al. | 360/66 |
| 3,228,016 | 1/1966 | Hopner | 360/40 |
| 3,404,392 | 10/1968 | Sordello | 360/77 |
| 3,438,018 | 4/1969 | Braun | 360/46 |
| 3,641,524 | 2/1972 | Norris | 360/40 |
| 3,952,329 | 4/1976 | Dent et al. | 360/40 |
| 3,994,016 | 11/1976 | Moghadam | 360/77 |
| 4,202,017 | 5/1980 | Gefton et al. | 360/66 |

Primary Examiner—Vincent P. Canney
Attorney, Agent, or Firm—Herbert F. Somermeyer

[57] ABSTRACT

A short duration pulse is recorded for each transition of a data bit stream. Such short duration pulses are AC bias recorded for enhancing recorder operations. The recording is preferably used with a buried control signal; the system enables simultaneous recording of data with reading or sensing the control signals. Specific equalization and detection techniques are disclosed. A DC restoring detector, operating synchronously to a detected bit stream, continually adapts its operation to readback signal amplitude variations. Because of high frequency aspects, the circuit elements can be mounted immediately adjacent a transducer or as close thereto as possible.

28 Claims, 15 Drawing Figures

BIASED PULSED RECORDING SYSTEMS AND METHODS

DOCUMENTS INCORPORATED BY REFERENCE

Co-filed co-pending application for patent, M. K. Haynes, entitled "Buried Servo Recording Systems and Methods," Ser. No. 101,380 filed Dec. 7, 1979 shows a control signal used in connection with the present invention.

BACKGROUND OF THE INVENTION

The present invention relates to the recording and reproduction of digital signals and to compensation techniques enhancing such recording and reproduction.

The art of digital magnetic recording, particularly on flexible media, has become increasingly complicated as continuing advances have been achieved both in linear densities and track densities. A recording channel engineer is faced now with important problems in a number of interacting areas.

Intersymbol interference is a problem which can be essentially ignored at lower linear densities. Such interference sometimes can be avoided by exercising design constraints on medium thickness, separation, and transducer gap lengths, as well as by using compromises between increasing densities and increased intersymbol interference. In flexible media, substrate asperities require relatively thick magnetic coatings. This problem can be contrasted with rigid disks wherein the substrate asperities are removed, allowing relatively thin magnetic coatings which tend to reduce intersymbol interference. However, such not being the case for flexible media, it is better to deal with the intersymbol interference than avoid it. These techniques then require equalization components to compensate for head to medium separation losses, gap loss in the transducer, and generally the lack of DC and low frequency response as well as phase or peak shift during recording.

Such equalization is largely determined by the clocking and detection methods. Threshold level detection and peak detection were the earlier methods used and are widely used despite peak shift and amplitude variation problems. Sampling detectors which drive a clock from zero crossings and then sample at the middle of bit period are often used with the flexible media, as well as with the rigid disk media. In turn, detection strategy is influenced by the recording system structure. The detection has to accommodate the dominate forms of interfering noise. When random noise is a major problem, then integration detectors are more useful. In contrast, when the readback signal is subject to severe amplitude variations, sampling detectors are more useful. The latter is suitable for flexible media wherein the media defects and so-called dropouts essentially determine the error rate of the data stream. That is, errors almost never occur under nominal good media conditions. Now as track densities increase, track following errors in disk environments lead to interference from adjacent record tracks as well as from old data in the present track—i.e., synchronous noise. These noise sources have characteristics similar to the desired data, such that integration detectors and simple peak or amplitude detectors cannot always successfully distinguish signals from noise. The combination of all of these effects poses severe problems in the design and manufacture of signal detection systems for magnetic recorders using flexible media.

Sampling detectors are useful in a recording channel having closely equalized raised cosine pulse spectrum. In general, magnetic recording channels cannot faithfully reproduce the DC and long wavelengths required for true or high quality raised cosine spectrum. Therefore, usually data encoding is used to reduce the long wavelength signal energy and thus control the wandering signal base line. Such encoding reduces the data rate, reduces detection capabilities and requires encode-decode circuits.

Flexible disk media exhibits anisotropic dimensional changes with temperature, humidity and age. These changes differ irregularly between batch sources of media, as well as locally within a given disk, card or tape. Track following of the servo-controlled type on an individual track basis appears to be an absolute necessity for increasing track density. Areal density is chiefly limited by track density, which in turn is determined by achievable track-following accuracy in combination with achievable off-track tolerances of data detection circuits. Such problems are complicated by different speeds of the media with respect to transducers. Accordingly, it is desired to have a control signal embedded in the record media wherein the record media is but a single magnetic coating layer. If a control signal is recorded before data signals are recorded, then the repeated recording and reproductions of data signals should not interfere with the quality of the control signal in the media. Therefore, it is desired to select a recording technique together with compensation techniques that will accommodate the preservation of prerecorded control signals.

The response of a magnetic recording channel diminishes rapidly at low densities and is zero at DC or zero frequency. Such low frequency response is limited by the finite length and height dimension of the transducer pole tips, by the finite medium thickness, and by the limited recording depth. Commonly used detection systems operate on a bit-by-bit technique; detection of the presence or absence of recording transitions occurs one at a time. The only information used is that of the transitions. Presently, low frequency components of the data signal are recorded onto the media even if they cannot be faithfully reproduced or successfully used in the data detection process. Therefore, the absence of such low frequencies should be facility accommodated.

SUMMARY OF THE INVENTION

The present invention provides an enhanced data recording method which does not record the signal frequency components which are not effectively reproduced. The invention carries this principle to a logical conclusion by recording only those parts of the frequency spectrum of a data signal which contribute directly to a bit-by-bit detection of data signal transitions. In general, data signal components below about one-fourth of the all ones or Nyquist frequency are attenuated without adversely affecting transition detection. That is, in one practical embodiment a single pole, high pass filter is inserted between the data signal source and the recording transducer. Such a single pole, high pass filter converts step transitions into sharply rising spikes or pulses of short duration having exponential tails. Such tails decrease close to zero within a bit period. Such a pulse-like signal is recorded on the record media by AC bias recording. The AC bias effectively overrides or erases the old data on thick media without a separate erase function even though the data current can be zero for a number of consecutive bit beriods. The actual locus of recording with AC bias recording is on a half-circular "coercivity contour." The field level at the point of recording is much less than the maximum field experienced, particularly for high density frequency components near the surface. Such AC overwrite therefore effectively erases the high frequency components representing the data signals.

The side effects of AC bias are to reduce nonlinear distortion, improve reliability at high linear densities, and enable simple equalization by linearizing the magnetic recording channels.

An important feature of this bias pulse write technique is that the lower frequency portion of the channel density spectrum is available for control signals usable for servo positioning and timing control.

Particular equalization techniques are also a portion of the present invention. For example, in the recording circuit a digital transversal filter has a portion which serves as a write driver with other portions serving as compensatory driver.

A DC restoring detector faithfully reproduces the base line and other low frequency components of the data signal when reading bias pulse recording. Specifically and importantly, operation of the DC restorer is synchronized to the detected data bit stream for yielding a DC reference magnitude faithfully related to data signals being detected.

Simultaneous recording data using the bias pulse techniques with reading a control signal is facilitated by the write process. Various blocking and circuit configurations are also a portion of the present invention as may pertain to bias pulse write.

DETAILED DESCRIPTION

Figure 2A:
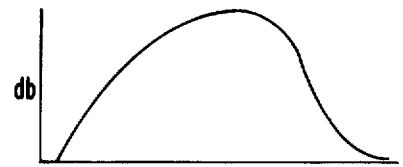
FIG. 2A is a frequency plot of the reproduced data signal before DC restoration.

Referring now more particularly to the drawings, like numerals indicate like parts and structural features in the various diagrams. A source of data signals 10 supplies a bit stream to write circuit 11. Circuit 11 converts the data bit stream from the usual NRZ representation to preferably an NRZI representation, such as signal 11A. The signal to be recorded 11A is supplied through a set of high pass filters HPF 12 which changes the signal waveform from 11A to a series of pulses of short duration or spikes 12A. Each spike has a rapid rising edge followed by an exponential tail 12T. 12T should not have a duration greater than a bit period of the NRZI signal 11A. From HPF 12, which will be detailed later, signal 12A travels through final amplifier 13 to a read/record transducer 14, for recording on a record medium 15. Record medium 15 consists of a flexible substrate 16 coated with a single magnetic layer 17. Single layer 17 includes lower layer portion 18 which contains a prerecorded control signal and an upper or surface layer portion 19, which receives the recording signal 12A for data signal recording. It is preferred that the control signal in lower portion 18 be simultaneously sensed while recording the data signal from final amplifier 13 in upper portion 19. To this end, control circuit 20 is also connected to transducer 14. Control circuit 20 includes servo positioning apparatus responsive to such control signals to position transducer 14 with respect to medium 15 as well as deriving timing or clock signals for constant density recording. Details of control circuit 20 are not pertinent to an understanding of the present invention, it suffices to say that those types of circuits are well known. Transducer 14 is treated as a bilateral signal transfer device. In this regard, it should be noted that the control signal in area or portion 18 has a low frequency characteristic whereas the data signals recorded in the upper portion 19 have a frequency characteristic exemplified by signal waveform 12A, and as shown generally in FIG. 2A.

For improving recording operations, AC bias source 21 supplies a single frequency sinusoid over lead 22 to final amplifier 13. AC bias source 21 has a frequency substantially higher than the higher frequencies of signal waveform 12A, such as from three to ten times data all 1's frequency. It has been found that the addition of the AC bias signal to the pulsed recording signal enables repeated recording in area 19 without deleterious effects on the control signal previously recorded in control area or lower portion 18. Further data signal previously recorded in portion 19 can be overwritten without an intervening erasing step.

Figure 2:
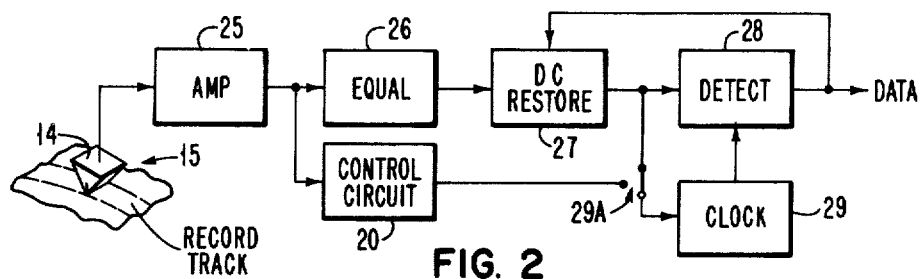
FIG. 2 is a simplified schematic-block diagram of a magnetic recorder signal reproduction channel employing the present invention.

The FIG. 2 illustrated signal reproduction circuit is also directly connected to transducer 14. Preamplifier 25 supplies the sensed control signal from portion 18 to control circuit 20. The data signals are filtered out of control circuit 20 using conventional low pass filtering techniques. The preamplifier 25 signals also are supplied to equalizer circuit 26 for processing the recorded data signal 12A. A front end portion of the equalizer 26 includes a high pass filter (not shown in FIG. 2) for eliminating the control signal from the equalization and the data detection circuits. In general, the high pass frequency filters in filter 12, as later described, and the high pass filter of equalizer 26 provide most of the compensation required for yielding an effective raised cosine recording channel. While some features of the channel response still need correction, the magnitude and duration are such that digital transversal techniques, as later described, can be used to accomplish the final tuning of the recording channel.

Returning to FIG. 2, equalizer 26 supplies its equalized signal to DC restore circuit 27, which in turn supplies its DC restored signal to detector 28 and to clock 29. In accordance with the invention, DC restore circuit 27 in turn receives the output data signal for automatically adjusting its operation, as later fully described. Additionally, equalizer 26 can be followed by a low pass or "roll off" filter, which reduces noise amplitudes above the needed data frequencies.

Figure 1:
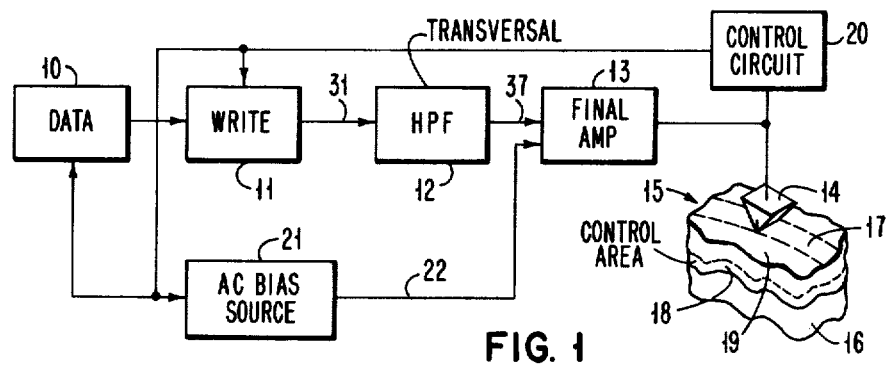
FIG. 1 is a schematic-block diagram of the recording channel employing the teachings of the present invention.
Figure 3:
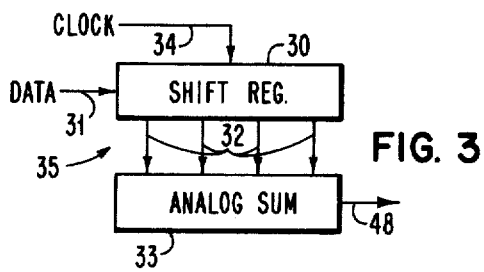
FIGS. 3 and 3A are simplified diagrams of a transversal filter usable with the FIG. 1 illustrated circuit.
Figure 4:
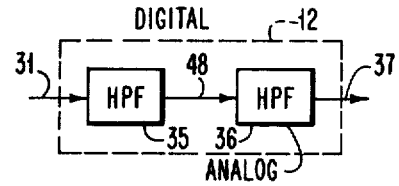
FIG. 4 is a diagrammatic conceptual diagram of the filter and characteristics of FIG. 1 illustrated recording channel.
Figure 3A:
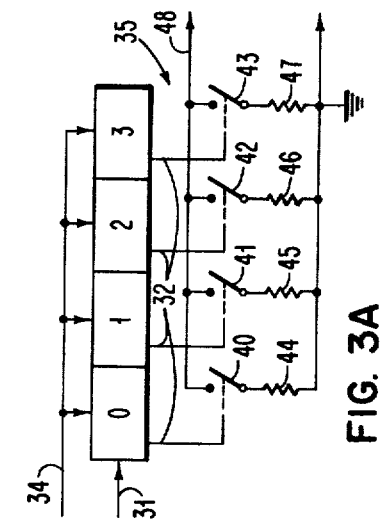

FIGS. 3, 3A and 4 illustrate a preferred equalization scheme for the bias pulse write channel of FIGS. 1 and 2. Configuration of HPF 12 is shown in FIG. 4 having digital transversal filter HPF 35, which then supplies its partially compensated signals to an analog filter HPF 36. As mentioned with respect to FIG. 2, HPF 36 combines with a corresponding high pass filter in the front end portion of equalizer 26 to complete most of the compensation. Digital transversal filter 35 receives the write data signal over lead 31 which is then synchronously shifted through a multi-bit shift register 30. A write clock, which can be derived from control circuit 20 or can be independent, supplies timing signals over lead 34 to synchronously shift register 30. An analog sum circuit 33 receives the shift register 30 output signals over leads 32 and provides an analog sum output over lead 48.

Transversal filter 35 has four digit positions which respectively electrically control four driver transistors, schematically represented as single pole, single throw switches 40, 41, 42 and 43. Leads 32 are connected to the base electrodes of the switch represented driver transistors. The emitter of the respective driver transistors are respectively connected via resistors 44, 45, 46 and 47 to ground or other reference potential. In general, the transistor controlled by the bit position 2, transistor switch 42, is a write driver. That is, the resistive impedance of resistor 46 is less than the resistive impedances of resistors 44, 45 and 47. Therefore, it is considered as a "normal" write driver. The other three switches 40, 41 and 43 have effects on the output analog sum signal on lead 48 in accordance with the respective resistive impedances 44, 45 and 47 using known transversal filter technique selections. In this particular embodiment, the data signal to be corrected has only simple overshoots. Therefore, only one polarity of correction is needed. Such a simple arrangement is made possible by employing DC restoration detection, together with the analog pulse write filters and the read filters to yield a raised cosine response at relatively low cost.

Figure 5:
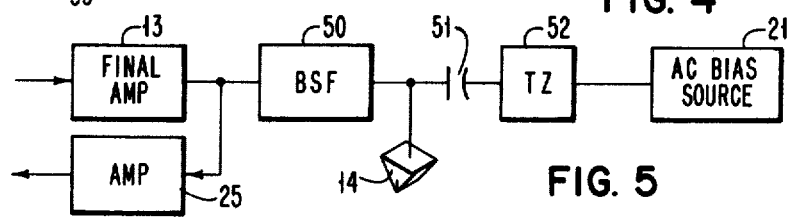
FIGS. 5 to 8 are combined schematic-block diagrams illustrating various circuit configurations for facilitating the practice of the present invention in the FIGS. 1 and 2 illustrated recording channels.

Because the control signal is relatively low frequency with respect to recorded data signal 12A, it is relatively easy to filter the exact control signal frequency components from the data write current with tuned trap filters to reject data signal components at the control signal frequency. If the control signal is essentially a single frequency sinusoid, then filtering becomes yet more facile. While switching diodes or transistors can be used for isolation, it is desirable in a high quality recording system to eliminate the noise introduced by semiconductor switching devices. Since most of the recording energy is provided by the bias signal, the AC bias recording tends to reduce the writing voltage of the data signal 12A. Since bias is a single frequency and is in general at least four times the data all 1's signal frequency, it is relatively easy to filter. Therefore, amplifier 25 of the signal reproduction circuit can be effectively protected by a simple filtering circuit, such as shown in FIG. 5. A lumped constant bandstop filter BSF 50 is tuned to resonance at the bias frequency of source 21, thus providing a very high series impedance at the bias frequency but a low impedance at the lower data frequencies. The lumped element BSF 50 can be of the L-type wherein a low shunt impedance at the bias frequency can be connected to the final amplifier 13 and preamplifier 25 side of BSF 50. This also provides a high impedance to ground at the lower data frequency. The electrical capacitor 51 can be inserted between transducer 14 and the AC bias source 21, having an impedance high to the data frequency but low to the higher bias frequency. While single-ended circuits are shown, it is to be understood that differential circuits may be employed with equal facility.

Figure 12:
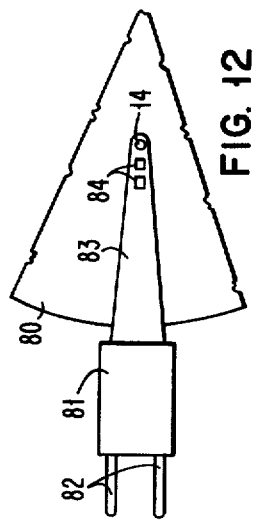
FIG. 12 is a diagrammatic showing of mounting circuits of the present invention on a transducer arm for reducing the length of leads between the circuits and a transducer.

A transmission line type filter TZ 52 may be interposed between capacitor 51 and AC bias source 21. The transmission line has an effective length of one-half the wavelength of the frequency of the bias frequency signal. The resonant impedance of transducer 14 and capacitor 51 can be exactly translated to an identical impedance seen by AC bias source 21. If the characteristic impedance of TZ 52 differs from that of the loads 14 and 51, some standing waves can occur. As best seen in FIG. 12, the lumped component filter 50, capacitor 51 and transmission line 52 can be on an arm supporting transducer 14. Additional components can be readily selected such that a resistive load impedance equal to the characteristic impedance of TZ 52 is achieved for eliminating standing waves. Then any electrical length of line can be employed.

Figure 6:
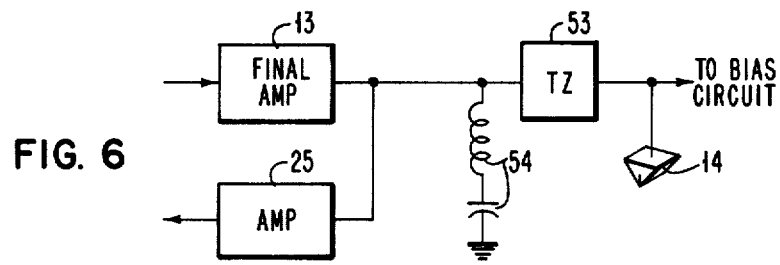
Figure 7:
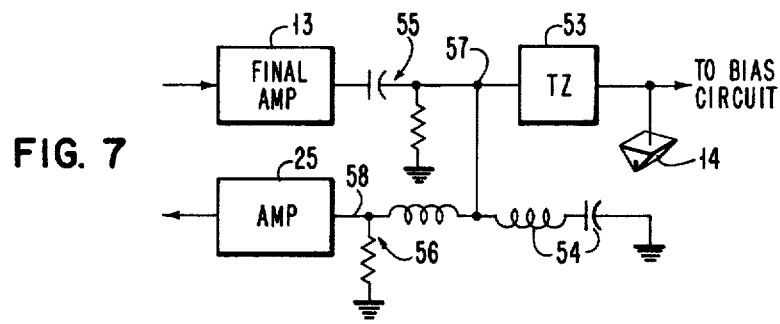

FIGS. 6 and 7 show two isolation techniques for isolating the bias signal from the recording and signal reproducing circuits of FIGS. 1 and 2. In FIG. 6, transmission line TZ 53 has a quarter wavelength at the bias signal frequency. Accordingly, the low resonant impedance of LC circuit 54 is transformed into a high impedance at transducer 14. FIG. 7 provides enhanced operation over the FIG. 6 illustrated configuration. That is, the signal applied to amplifier 25, the input amplifier, to the signal reproduction circuit of FIG. 2, should be a sharp rise spike with a short exponential tail going to zero current within a bit period. Such a peak or spike consists of very high frequency components which generally are higher than required for the bandwidth of read preamplifier 25. Such a voltage peak can be attenuated by the FIG. 7 circuit by the RL components 56. RC components 55 constitute high pass filter 36 of FIG. 4. The resistive component of RC circuit 55 should equal the characteristic impedance of line TZ 53 for absorbing reflections. If a control signal circuit 20 is employed in connection with the FIG. 7 arrangement, a low pass filter input to that circuit would normally be connected to junction 57, or at the input 58 to amplifier 25.

Figure 8:
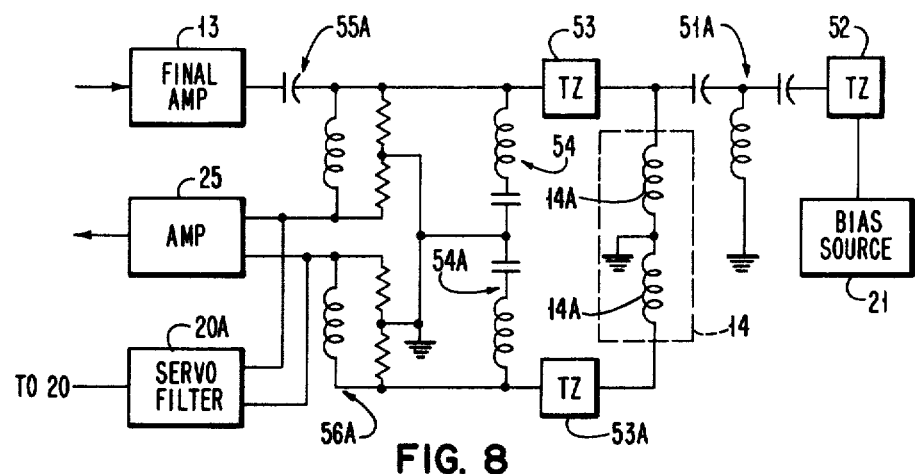

FIG. 8 illustrates a more complete system of filters and isolation circuits for using the bias pulse write of the present invention in combination with the control signal circuit 20. In this particular arrangement, the transducer 14 has a center tapped coil 14A having a center tap connected to ground reference potential. Final amplifier 13 may be single-ended, but preamplifier 25 is preferably a differential or double-ended circuit. Servo filter 20A is a low-pass differentially-connected filter for supplying the control signal to circuit 20 of FIG. 1. The numerals of FIG. 8 correspond favorably to those of FIG. 7, in particular, except that a suffix A has been added to those circuits which have slight changes but which are readily understood from an inspection of the FIG. 7 to accommodate the center tap winding 14A of transducer 14.

It is preferred that the detection system employed with bias pulse write be a DC restoring detector. Such a detector restores the eliminated DC and low frequency components to the signal being reproduced just prior to data detection. In accordance wih the invention DC restoration includes sampling and holding the readback signal and timing operations such that the DC restorer reference is adapted with readback signal amplitude variations, including signal dropouts. This reference level is also a threshold level for data detection.

In a binary channel, such as used in digital magnetic recording, as soon as one signal transition is correctly identified, the remainder of the subsequent deviations from the input signal can be determined and corrected before the next expected transition occurs. In the present invention, after each detected transition, a restoring detector regenerates the eliminated DC level and the low frequency components as if they had actually been transmitted, but without the noise components of the magnetic recording channel. Then, for faithful detection, equalizer 26 needs mainly to compensate for gap and separation losses, and to correct the phase characteristics of the readback signal.

Figure 1A:
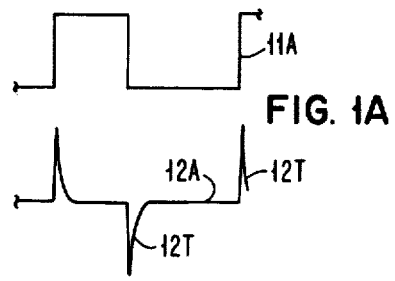
FIG. 1A is a diagrammatic showing of data bit and recording bit signal waveforms.
Figure 9:
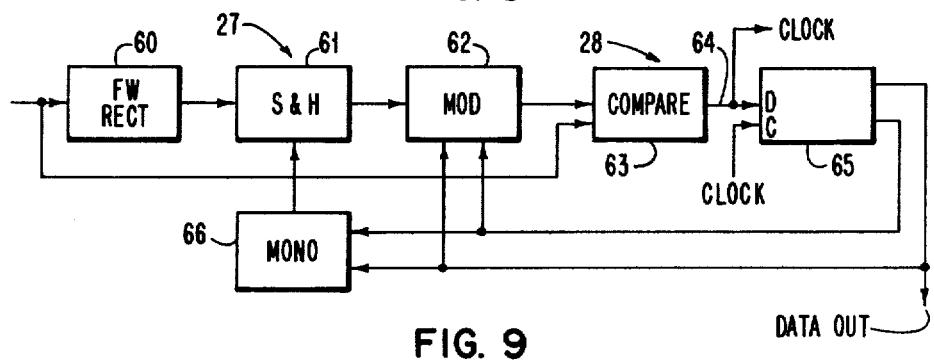

FIG. 9 is a simplified diagram of a DC restoring detector 27, 28. Full wave rectifier 60 full wave rectifies the equalized readback signal received from equalizer 26. Sample and hold circuit (S&H) 61 is timed by the output of data detector 28 for sampling the full wave rectified signal and using same to drive amplitude modulator 62. Modulator 62 receives the data signals from detector 28 to amplitude modulate the sampled and held readback signal to S&H 61. The amplitude modulated output of modulator 62 is a reference signal for compare circuit 63 of detector 28. Compare circuit 28 compares the received equalized signal with the reference signal for detecting same and supplies a timed detected control signal over line 64 as a data input to detector latch (D-type latch) 65. Latch 65 is clocked at "C" by a usual phase lock loop oscillator (clock) which can be driven by the equalized readback signal or by the control signal from lower portion 18. The output of latch 65 is representative of the data signal carried by the readback signal. The line 64 signal can be used directly for controlling a clock or phase lock loop oscillator (not shown) which times the data detection of detector latch 65. Compare circuit 63 is merely a voltage threshold circuit. Mono-stable multivibrator 66, timed by detector latch 65, opens S and H circuit 61 to receive the full wave rectified signal from circuit 60 at a predetermined point within the bit cycle—i.e., when it is expected the peak of the readback signal will be occurring. In the present embodiment, this timing occurs at the beginning of a bit period as shown in FIG. 1A. Delay circuits can be included in S&H 61 for adjusting the sampling such that the peak of the full wave rectified signal is precisely timed to the timing of monostable circuit 66. Control of such circuits is well known and is not fully described for that reason.

Figure 10:
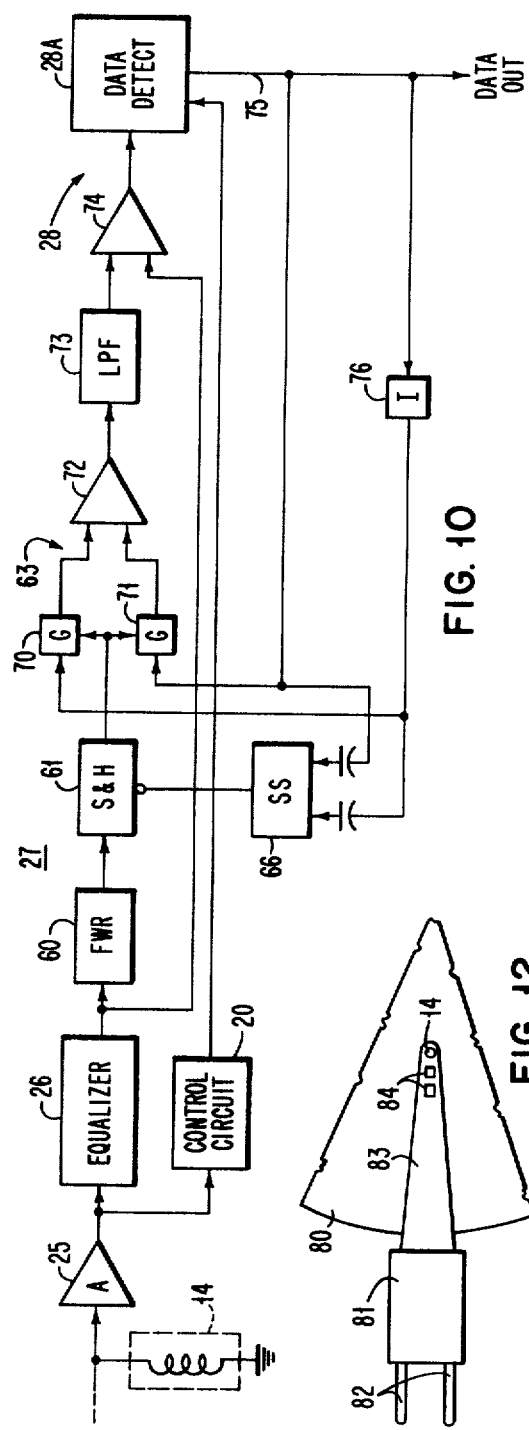

FIG. 10 shows a complete readback system similar to FIG. 2 but accents the analog gating usable in compare circuit 63. The output of the sample and hold circuit 61 (same circuit as in FIG. 9) is applied to a pair of analog gates 70, 71, respectively, enabled by the output data value—i.e., whether it is a one or a zero. The gated sample and held full wave rectified signal then goes through differential amplifier 72 yielding a signal polarity in accordance with the value of the data output. The amplified signal is then low pass filtered by circuit LPF 73 for establishing a DC reference value for switching comparator-amplifier 74. The equalized readback signal from equalizer 26 is supplied to the signal input of switching comparator amplifier 74 to be amplitude threshold compared with the LPF 73 supplied DC reference signal. The threshold detected signal is then supplied to the data detector 28 which can be a latch, such as latch 65, in FIG. 9. A single line 75 output from data detector 28 is shown. Inverter circuit 76 provides both polarities a binary output signal for controlling gates 70, 71 as well as setting and resetting monostable multivibrator 66. For purposes of brevity, the clocking circuits (which are of known design) are omitted from FIG. 10.

Figure 11:
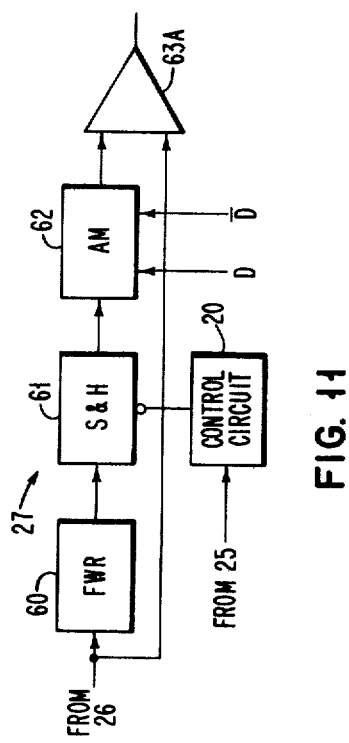
FIGS. 9 through 11 illustrate DC restoring detectors usable with the FIG. 2 illustrated signal reproduction circuits.

FIG. 11 is a simplified version showing full wave rectifier 60 with sample and hold circuit 61 controlled by control circuit 20. Control circuit 20 is timed by the lower portion 18 control signal received from amplifier 25. Amplitude modulator 62 is driven by the data and not data signal values from the data detector 28A. A simple differential amplifier 63A of the switching type provides amplitude threshold detection of the readback signal in a manner similar to the operation of amplifier 74.

FIG. 12 is a simplified diagrammatic showing of an apparatus employing the invention in a disk environment. A rotating record storage disk 80 is positioned adjacent to radial transducer positioning carriage 81, which runs on radially aligned tracks 82 for positioning transducer 14 on one of a large plurality of concentric record tracks (not shown) on disk 80. Transducer 14 is suitably supported on carriage 81 via head support arm 83. Small rectangles 84 immediately adjacent transducer 14 contain most of the components illustrated in the present application for ensuring that the lead length between the circuits of the invention and transducer 14 are minimized. This is particularly important at the higher frequencies of operation because of parasitic capacitances. Accordingly, it is highly advantageous to mount the integrated circuit components as close to transducer 14 as possible. The mechanical dynamics of head arm 83 are easily adapted to accommodating the very slight mass addition of these circuits to the free end of arm 83. The transmission lines of the present invention can be of a so-called printed circuit type as is well known in the arts.

Although the present invention has been particularly shown and described with reference to preferred embodiments thereof, it will be understood by those skilled in the art that various changes in form and details may be made therein without departing from the spirit and scope of the invention.

What is claimed is:

1. A signal processing system for digital signals having a succession of transitions between plural signal levels, the improvement including in combination:
   high pass filter means for passing only the higher frequency components of said digital signals;
   means for linearly adding a bias signal to said higher frequency signal components, said bias signal having a higher frequency than said higher frequency components;
   means for receiving said linearly added signal and recording same on a magnetic medium;
   said high pass filter means including a transversal digital filter, and
   an analog high pass filter in said high pass filter means receiving partially filtered signals from said transversal filter and supply same to said means for linearly adding.

2. The apparatus set forth in claim 1 wherein said digital transversal filter includes a plurality of semiconductor switch means, analog summing means receiving signals from said semiconductor switch means and one of said switch means capable of supplying a normal write current amplitude to said recording means.

3. The apparatus set forth in claims 1 or 2 wherein said high pass transversal filter means includes a digital shift register receiving said data signal,
   means for synchronously shifting the signal contents of said register, and
   means supplying output signals of said shift register to said semiconductor switch means for controlling same whereby transversal filtering action occurs.

4. The apparatus set forth in claim 1 wherein a magnetic medium adapted to be recorded upon by said apparatus includes a prerecorded low frequency control signal, the improvement further including in combination:
   readback means connected to said recording means for receiving said control signal simultaneously with the recording signal, and
   means in said apparatus for utilizing said control signal.

5. The apparatus set forth in claim 4 wherein said utilization means is connected to said data signal means for timing the supplying of said transitions to said high pass filter for synchronously recording on said media in accordance with the characteristics of said sensed control signal.

6. The apparatus set forth in claim 4 wherein said recording means includes a transducer adapted to be in operative engagement with said record medium, a transmission line type isolation means operatively connecting said bias means to said transducer means, and
   a band stop filter connecting said recording means and said readback means to said transducer whereby said transducer is connected to said recording means, said bias means and said read means for simultaneous operation of all such means.

7. The apparatus set forth in claims 4 or 6 wherein said transducer has a center tap coil winding,
   said readback means and said utilization means being differentially connected to said center tap coil winding and said recording and said bias means being connected to said transducer in a single ended connection.

8. The apparatus as set forth in claims 4 or 5 wherein said readback means includes a sample and hold DC restore means,
   data detection means connected to said sample and hold DC restoring means for converting sensed signals to data signals, and
   timing means for synchronizing the operation of said sample and hold DC restore means with respect to said data signal.

9. The apparatus as set forth in claim 8 wherein said sample and hold DC restore means includes a full wave rectifier means for receiving said data signal and supplying a full wave rectified signal to said DC restore means, and
   said detector means including a compare circuit for comparing a DC restored reference signal to said received data signal for indicating the informational content thereof.

10. The apparatus set forth in claim 9 wherein said DC restore means further includes amplitude modulation means connected to said detector means for being synchronized thereby and receiving said DC reference for supplying same to said compare circuit.

11. The apparatus as set forth in claim 4 wherein said readback means includes means connected to said utilization means for receiving said control signal whereby operation of said read means is synchronized by said utilization means sensed control signal.

12. A data recording apparatus having a transducer with a single gap and adapted to be in operative engagement with a record medium having a prerecorded low frequency control signal,
   a recording portion having high pass filter means for supplying data signals to said transducer and having frequency components substantially of higher frequency than said control signal,
   AC bias means connected to said transducer for linearly adding an AC bias signal to said filtered recording signal, and
   readback means connected to said transducer for sensing said control signal whenever said recording means is supplying said data signal.

13. The apparatus set forth in claim 12 further including means operatively connecting said control signal sensing means to said recording portion for synchronizing operation thereof with respect to said control signal.

14. The apparatus set forth in claims 12 or 13 wherein said readback means includes a data readback portion, said data readback portion having a high pass filter matched to said high pass filter means of said recording means, and
   a DC restoring detector connected to said readback high pass filter means for detecting data received thereby for supplying a detected signal representing information signals carried in a readback signal.

15. The apparatus set forth in claim 14 further including a DC restoring circuit in said DC restoring detector and means transferring said detected signal to said DC restoring circuit for timing operation thereof.

16. The apparatus set forth in claim 15 wherein said DC restoring circuit includes a sample and hold circuit having its sampling operation of a readback timed by said detected signal.

17. The apparatus set forth in claim 14 wherein said control signal utilization means further synchronously controls operation of said data readback means.

18. The apparatus set forth in claims 12 or 14 wherein said high pass filter means includes a high pass filter attachable to a readback circuit high pass filter and further including a transversal filter of a digital type including a plurality of semiconductor switches, one of which is fully capable and designed to supply maximum recording signal current, and other ones of said semiconductor switches supplying less than said maximum recording current for providing a limited filtering action to said recording current and said transversal filter supplying partially shaped signals to said high pass filter in said recording means.

19. The apparatus set forth in claims 12 or 14 further including electrical isolation means connecting said transducer to said bias source and to said recording and readback means wherein said respective isolation means have frequency characteristics for passing only those frequency components between said transducers and to the respective means to which it is connected.

20. A digital data recorder adapted to cooperate with a record medium having a low frequency control signal therein, a single gap transducer adapted to sense said control signal while recording data signals on said medium, said recorder including recording means for supplying high pass filtered recording signals and having an AC bias circuit for recording said signals in the presence of said AC bias circuit, the improvement including in combination:
readback means connected to said transducer along with said bias means and said recording means and having a high pass filter exhibiting high pass filter characteristics substantially similar to the high pass filter characteristics of said recording means;
DC restoring means receiving a high pass filtered signal from said readback means high pass filters;
a data detector receiving said DC restored signals and said readback signal for detecting data signals; and
means for timing operation of said DC restoring means synchronously to said detected data signals.

21. The apparatus set forth in claim 20 wherein said DC restoring means includes a full wave rectifier receiving said high pass filtered signal, a sample and hold circuit receiving said full wave rectified signal, said sample and hold circuit being connected to said timing means for synchronously sampling said full wave rectified signal with respect to at least said control signal and comparison means for detecting data from said sample and hold circuit 22. The method of operating a signal transducer having a single recording-reproducing gap adapted to be in operative relationship with a record medium having a prerecorded control signal thereon, the steps of:
supplying a high pass filtered signal to said signal transducer for recording on said medium;
supplying an AC bias signal to said signal transducer for recording said high pass filtered signal on said medium; and
simultaneously sensing said control signal through said signal transducer.

23. The method set forth in claim 22 further including the steps of:
synchronizing said high pass filter signals to said sensed control signals.

24. The method set forth in claim 23 further including the steps of sensing said data signal and detecting the data in said sensed data signal by first DC restoring said data signal for facilitating amplitude discrimination of informational content therein.

25. The method set forth in claim 22 including synchronizing the operation of said data detection by said sensed control signal.

26. The method of reproducing digital signals recorded on a magnetic medium, the steps of:
sensing recorded signals to provide a readback signal carrying a digital signal;
sampling said readback signal at peaks thereof and holding the sampled amplitude,
extracting said carried digital signal from said readback signal by comparison with said held sampled amplitude,
amplitude modulating said held sampled amplitude prior to extracting said carried digital signal by said extracted digital signal, and
adjusting the sampling time of said readback signal based upon the extracted digital signal value.

27. An electronic circuit arrangement for processing an analog signal carrying digital information,
first circuit means for receiving the signal to be processed;
second circuit means connected to said first circuit means for time sampling amplitudes of said signal to be processed at about the peak amplitude thereof;
third circuit means connected to said second circuit means for amplitude modulating said sampled amplitude;
fourth circuit means connected to said first and third circuit means for combining said signal to be processed and said modulated held amplitude to supply a digital signal representation of said digital information; and
fifth circuit means connected to said fourth circuit means and said second and third circuit means for operating said second and third means in accordance with said digital signal.

28. A signal processing circuit for processing an analog signal carrying digital information to a digital signal carrying said digital information,
the improvement comprising:
first circuit means for repetitively sampling said analog signal amplitude to supply a sampled amplitude signal indicative of a DC level of said analog signal;
second circuit means connected to said first circuit means for receiving said supplied sampled signal with said analog signal to supply said digital signal; and
third circuit means connected to said first and second circuit means for supplying said digital signal to said first circuit means to adjust the operation thereof in accordance with said digital signal.

* * * * *